(12) United States Patent
Hansen et al.

(10) Patent No.: US 11,170,196 B2
(45) Date of Patent: Nov. 9, 2021

(54) EXTRACTING FINGERPRINT FEATURE DATA FROM A FINGERPRINT IMAGE

(71) Applicant: FINGERPRINT CARDS AB, Göteborg (SE)

(72) Inventors: Morten Hansen, Hellerup (DK); Klaus Andersen, Hvidovre (DK); Arne Husth, Hellerup (DK); Michael Hansen, Copenhagen (DK)

(73) Assignee: FINGERPRINT CARDS AB, Gothenburg (SE)

( * ) Notice: Subject to any disclaimer, the term of this patent is extended or adjusted under 35 U.S.C. 154(b) by 81 days.

(21) Appl. No.: 16/609,274

(22) PCT Filed: Apr. 20, 2018

(86) PCT No.: PCT/SE2018/050403
§ 371 (c)(1),
(2) Date: Oct. 29, 2019

(87) PCT Pub. No.: WO2018/203795
PCT Pub. Date: Nov. 8, 2018

(65) Prior Publication Data
US 2020/0184189 A1    Jun. 11, 2020

(30) Foreign Application Priority Data

May 2, 2017  (SE) .................... 1750530-6

(51) Int. Cl.
*G06K 9/00* (2006.01)
*G06K 9/40* (2006.01)

(52) U.S. Cl.
CPC ..... *G06K 9/00067* (2013.01); *G06K 9/00013* (2013.01); *G06K 9/40* (2013.01)

(58) Field of Classification Search
CPC .. G06K 9/00067; G06K 9/00013; G06K 9/40; G06K 9/03; G06K 9/0002; G06T 5/00
See application file for complete search history.

(56) References Cited

U.S. PATENT DOCUMENTS

| | | |
|---|---|---|
| 6,292,576 B1 | 9/2001 | Brownlee |
| 6,535,622 B1 | 3/2003 | Russo et al. |
| 7,035,441 B2 * | 4/2006 | Bergenek ........... G06K 9/00013 340/5.53 |

(Continued)

FOREIGN PATENT DOCUMENTS

| | | | |
|---|---|---|---|
| EP | 0090377 A2 * | 10/1983 | ............... G07C 9/37 |
| EP | 3190544 A1 | 7/2017 | |

(Continued)

OTHER PUBLICATIONS

PCT International Search Report and Written Opinion dated Jun. 12, 2018 for International Application No. PCT/SE2018/050403, 14 pages.
Wang, H., "Phase Noise and Fundamental Sensitivity of Oscillator-Based Reactance Sensors," IEEE Transactions On Microwave Theory and Techniques, vol. 61, No. 5, May 2013, pp. 2215-2229.
Extended European Search Report dated Dec. 23, 2020 for EP Application No. 18794252.9, 9 pages.

*Primary Examiner* — John B Strege
(74) *Attorney, Agent, or Firm* — RMCK Law Group, PLC

(57) ABSTRACT

The invention relates to a method of a fingerprint sensing system of extracting fingerprint feature data from an image captured by a fingerprint sensor of the fingerprint sensing system, and a fingerprint sensing system performing the method.

20 Claims, 12 Drawing Sheets

(56) References Cited

U.S. PATENT DOCUMENTS

| | | | | |
|---|---|---|---|---|
| 7,039,224 B2 * | 5/2006 | Hamid | ............... | G06K 9/00046 |
| | | | | 382/124 |
| 7,440,596 B2 * | 10/2008 | Kondo | ............... | G06K 9/00087 |
| | | | | 283/68 |
| 7,542,590 B1 * | 6/2009 | Robinson | ........... | G06K 9/00006 |
| | | | | 382/115 |
| 7,885,436 B2 * | 2/2011 | Russo | ................ | G06K 9/00026 |
| | | | | 382/124 |
| 7,965,874 B2 * | 6/2011 | Abiko | ............... | G06K 9/00067 |
| | | | | 382/116 |
| 2014/0205162 A1 * | 7/2014 | Hara | .................... | G06K 9/0008 |
| | | | | 382/125 |
| 2014/0267659 A1 * | 9/2014 | Lyon | ....................... | G06K 9/03 |
| | | | | 348/77 |
| 2014/0286546 A1 * | 9/2014 | Shin | .................. | G06K 9/00067 |
| | | | | 382/124 |
| 2017/0032165 A1 | 2/2017 | Hansen et al. | | |
| 2017/0061108 A1 | 3/2017 | Kwon et al. | | |
| 2017/0091595 A1 | 3/2017 | Wang et al. | | |

FOREIGN PATENT DOCUMENTS

| | | | |
|---|---|---|---|
| JP | H03248278 A | 11/1991 | |
| JP | H03266186 A | 11/1991 | |
| JP | 2011138427 A | 7/2011 | |
| KR | 20060035504 A | 4/2006 | |
| WO | 9926187 A1 | 5/1999 | |
| WO | 2017196238 A1 | 11/2017 | |
| WO | 2017196239 A1 | 11/2017 | |

* cited by examiner

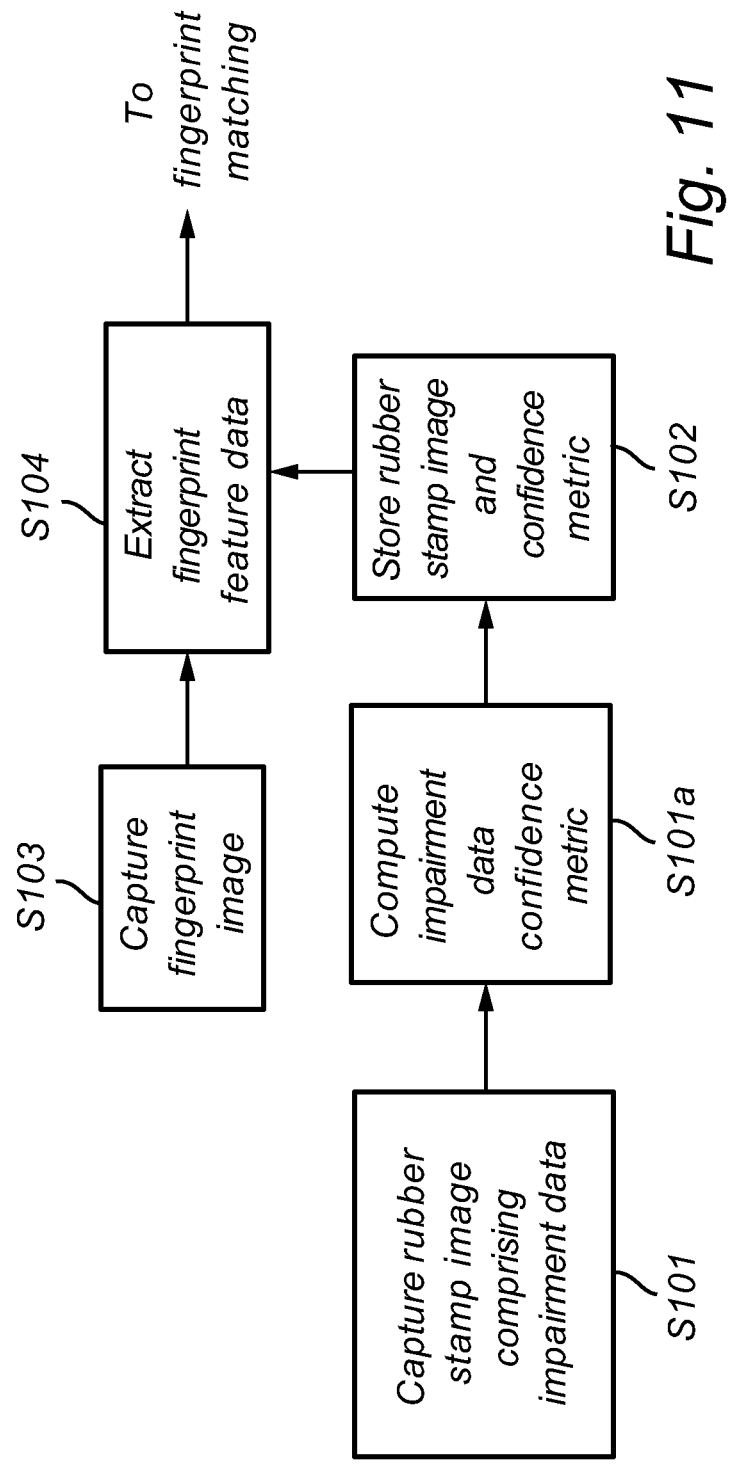

EXTRACTING FINGERPRINT FEATURE DATA FROM A FINGERPRINT IMAGE

CROSS-REFERENCE TO RELATED APPLICATIONS

This application is a 371 U.S. National Stage of International Application No. PCT/SE2018/050403, filed Apr. 20, 2018, which claims priority to Swedish Patent Application No. 1750530-6, filed May 2, 2017. The disclosures of each of the above applications are incorporated herein by reference in their entirety.

TECHNICAL FIELD

The invention relates to a method of a fingerprint sensing system of extracting fingerprint feature data from an image captured by a fingerprint sensor of the fingerprint sensing system, and a fingerprint sensing system performing the method.

BACKGROUND

Electronic devices such as smart phones, laptops, remote controls, tablets, smart cards, etc., may use fingerprint recognition e.g. to allow a user to access the device, to authorize transactions carried out using the electronic device, or to authorize the user for accessing a service via the electronic device.

Hence, the electronic device, being for example a smart phone, is equipped with a fingerprint sensor on which the user places her finger in order for the sensor to capture an image of the fingerprint and compare the recorded fingerprint with a pre-stored, authenticated fingerprint template. If the recorded fingerprint matches the pre-stored template, the user is authenticated and the smart phone will perform an appropriate action, such as transitioning from locked mode to unlocked mode, in which the user is allowed access to the smart phone.

For a fingerprint sensor—being based on e.g. a capacitive, optical or an ultra sonic detection signal from the finger—requirements on the materials present between the user's finger and the fingerprint sensing elements (known as pixels) of the sensor are high in terms of precision in thickness and material properties such as for instance dielectric homogeneity for capacitive sensors. In case of a capacitive sensor, when the user touches a fingerprint sensing area (covered by e.g. glass or ceramic) of the smart phone, a capacitor is formed between a surface of the fingerprint sensing area and the fingerprint sensor arranged inside the smart phone. By measuring the capacitance between the surface touched by the user and the sensor at each pixel, the fingerprint of the user may be derived from an image captured by the fingerprint sensor of the user's finger.

However, due to a number of reasons, impairment data in the form of quasi-stationary noise may be present in the image captured by the fingerprint sensor which renders the deriving of a fingerprint from a captured image more difficult.

For capacitive sensors, this type of noise is referred to as capacitive noise and may occur for instance due to impairments such as variations in the material stack-up height between the surface of the fingerprint sensing area and the fingerprint sensor, a damaged surface of the fingerprint sensing area in the form of for instance scratches, or due to impairments such as sensor warpage or imperfections in material properties, such as impurities in the material adhesive between the stack-up and the sensing area and give rise to a recurring noise pattern in captured images. In order to eliminate capacitive noise, sub-μm precision and extremely pure materials may be required. In a practical scenario, such precision in materials is difficult to achieve.

SUMMARY

An object of the present invention is to solve, or at least mitigate, this problem in the art and thus to provide an improved method of extracting fingerprint feature data from an image captured by a fingerprint sensor of the fingerprint sensing system.

This object is attained in a first aspect of the invention by a method of a fingerprint sensing system of extracting fingerprint feature data from an image captured by a fingerprint sensor of the fingerprint sensing system. The method comprises capturing at least one image of an object contacting the fingerprint sensor, the image comprising impairment data caused by impairments that the fingerprint sensor is subjected to, storing the captured image comprising the impairment data, capturing at least one further image of a fingerprint of a finger contacting the fingerprint sensor, and extracting fingerprint feature data from the captured at least one further image, wherein at least some of the feature data in sections of the image which are indicated in the stored image to comprise impairment data is lesser relied upon when extracting the fingerprint feature data than the feature data in sections of the image which are not indicated to comprise impairment data.

This object is attained in a second aspect of the invention by a fingerprint sensing system comprising a processing unit configured to extract fingerprint feature data from an image captured by a fingerprint sensor of the fingerprint sensing system. The fingerprint sensor is configured to capture at least one image of an object contacting the fingerprint sensor, the image comprising impairment data caused by impairments that the fingerprint sensor is subjected to, and to capture at least one further image of a fingerprint of a finger contacting the fingerprint sensor. The processing unit is configured to store the captured image comprising the impairment data, and extract fingerprint feature data from the captured at least one further image, wherein at least some of the feature data in sections of the image which are indicated in the stored image to comprise impairment data is lesser relied upon when extracting the fingerprint feature data than the feature data in sections of the image which are not indicated to comprise impairment data.

In an embodiment, the object contacting the sensor for capturing an image comprising impairment data is a so called rubber stamp applied during production tests of the fingerprint sensor. In an alternative embodiment, the object is a real finger of a user, in which case a plurality of images typically are captured and combined into a single image comprising the impairment data. This could be performed during normal user operation.

In either case, the image comprising the impairment data is stored for subsequent use when a user of an electronic device, being e.g. a smart phone, in which the fingerprint sensing system is implemented is to be authenticated The stored image is taken into account during subsequent feature data extraction in that all or some of the fingerprint feature data located in the areas of the captured image where the impairment data is present is lesser relied upon (or even excluded) when extracting the fingerprint feature data than the feature data in sections of the image which are not indicated to comprise impairment data.

Advantageously, this reduces the risk of so called false positives caused by fingerprint feature data being incorrectly extracted from impairment data in a captured image. Ultimately, this reduces the risk of falsely authenticating a user from feature data which is obscured by impairment data, potentially resulting in erroneously extracted fingerprint feature data.

Further advantageous is that tampering or spoofing of the smart phone is hampered. A malicious third party may try to manipulate the fingerprint sensing system by modifying the stored image comprising the impairment data in order to gradually change the stored image to eventually be able to authenticate his or her own fingerprints against a pre-stored fingerprint template. By using the stored image in the fingerprint feature extraction, which stored image represents the impairment data that the fingerprint sensor is subjected to, any malicious modifications to the stored image is likely to result in unsuccessful feature extraction, and ultimately non-authentication of a spoofing third party.

In an embodiment, the further captured image of a fingerprint is processed with the stored captured image comprising the impairment data in order to at least partly suppress the impairment data in the further captured image. For instance, the impairment data of the stored image can be deducted from the corresponding data of the further captured image. This would in practice have the result that the impairment data advantageously is suppressed, or even cancelled out, in the captured fingerprint image, while the part of the image pertaining to the fingerprint is unaffected.

In another embodiment, a confidence metric is computed for the stored captured image comprising the impairment data, wherein when extracting the fingerprint feature data from the captured at least one further image, the feature data in sections of the image which are indicated in the stored image to comprise impairment data is more relied upon in case a value of the confidence metric indicates a low confidence for the impairment data, and less relied upon in case a value of the confidence metric indicates a high confidence for impairment data. Advantageously, if the impairment data indeed is present, as indicated by a high confidence metric value, corresponding sections of the captured image should be less relied upon when extracting feature data.

In an embodiment, a value of the confidence metric may advantageously be determined by comparing several images. If there is an area where the different images differ substantially, the confidence in that area would be considered low. On the other hand; if the impairment data appear identical in all images, a higher confidence value would be assigned to that area. For instance, the confidence metric could be assigned a range of 0 to 1, where a value close to 1 indicates high confidence while a value close to 0 indicates low confidence.

In yet an embodiment, a presence metric is computed for the impairment data in the captured image, wherein when extracting the fingerprint feature data from the captured at least one further image, the feature data in sections of the image which are indicated in the stored image to comprise impairment data is more relied upon in case a value of the presence metric indicates a low presence of the impairment data, and less relied upon in case a value of the presence metric indicates a high presence of the impairment data.

The presence metric may be computed for the further captured image in both a case where suppression of impairment data is performed, as well as in a case where no impairment data suppression is undertaken. Now, in this particular exemplifying embodiment, after the impairment data has been suppressed from the captured image, it is determined to which degree the impairment data is still present in the enhanced captured image. That is, a presence metric is computed reflecting this degree.

If the suppression of impairment data is successful, the presence metric is likely given a low value, indicating that the presence of impairment data is weak in the enhanced captured image. To the contrary, if only a slight suppression of impairment data is attained, the presence metric is likely given a high value, indicating that the presence of impairment data is strong in the enhanced captured image.

Advantageously, by computing the presence metric and subsequently taking the presence metric into account upon extracting fingerprint feature data, the feature extraction will depend on whether the impairment data is "strong" or "weak" in the enhanced captured image.

Hence, a low-value presence metric indicates that the (remaining) impairment data in the image is weak, wherein when extracting the fingerprint feature data from the captured image, the feature data in sections of the image which are indicated by the presence metric to comprise weak impairment data is more relied upon.

In contrast, a high-value presence metric indicates that the (remaining) impairment data in the image is strong, wherein when extracting the fingerprint feature data from the captured image, the feature data in sections of the image which are indicated by the presence metric to comprise strong impairment data is less relied upon.

It should be understood that the presence metric may be combined with—and balanced against—the confidence metric. It may for instance be envisaged that the confidence metric is high, indicating that the corresponding sections of the image should be less relied upon when extracting features as previously discussed. However, if the presence metric indicates weak impairment data, the corresponding sections of the image may still be relied upon to a certain degree.

Conversely, a scenario may arise where the confidence metric is low, indicating that the corresponding sections should be more relied upon as previously discussed. However, if the presence metric indicates strong impairment data, the corresponding sections of the image may be less relied upon as compared to an embodiment where only the confidence metric is considered.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 11 illustrates a flowchart of the method of extracting fingerprint feature data from a captured image according to a further embodiment of the present invention;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
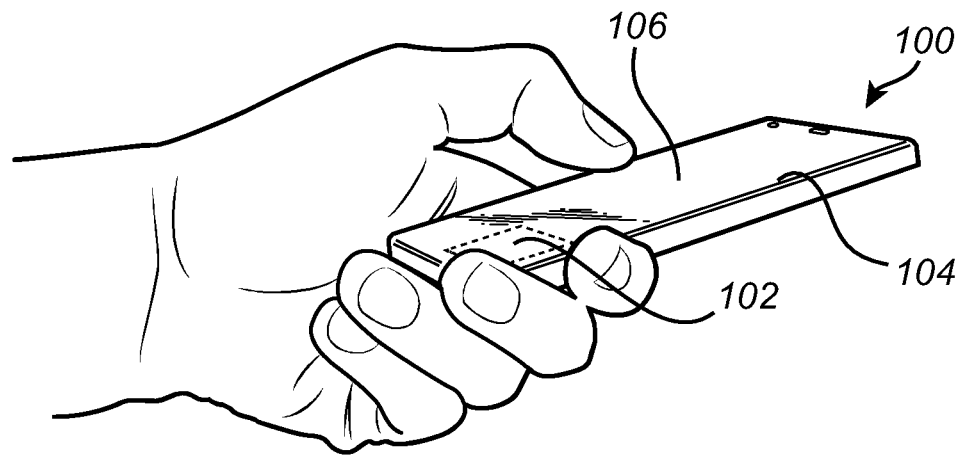
FIG. 1 shows an electronic device in the form of a smart phone in which the present invention may be implemented.

FIG. 1 shows an electronic device in the form of a smart phone 100 in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, smartwatches, etc., or any other type of present or future similarly configured device utilizing fingerprint sensing.

Figure 2:
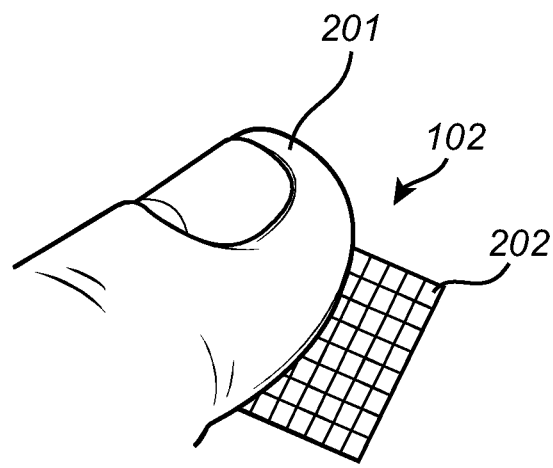
FIG. 2 shows a view of a fingerprint sensor onto which a user places the finger.

FIG. 2 illustrates a somewhat enlarged view of the fingerprint sensor 102 onto which a user places her finger 201. In the case of employing a capacitive sensing technology, the fingerprint sensor 102 is configured to comprise a plurality of sensing elements. A single sensing element (also denoted as a pixel) is in FIG. 2 indicated by reference numeral 202.

It is noted that the present invention is equally applicable to other fingerprint sensing technologies, such as e.g. optical or ultrasonic sensing.

Figure 3:
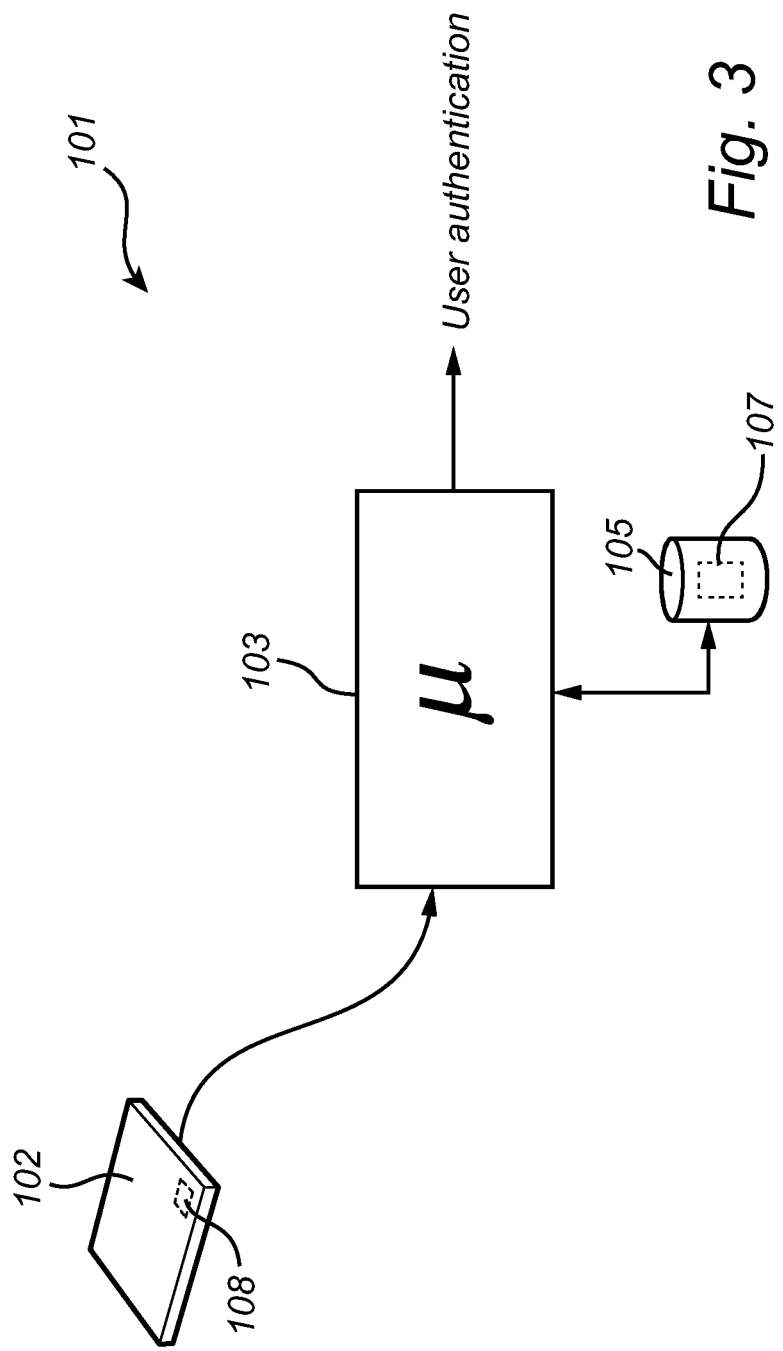
FIG. 3 shows a fingerprint sensor being part of a fingerprint sensing system according to an embodiment.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1. A local memory 108 such as a one-time programmable (OTP) memory, flash memory, or random access memory (RAM) may be embedded in the sensor die.

Now upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

The fingerprint sensor 102 may be implemented using any kind of current or future fingerprint sensing principle, including for example capacitive, optical, ultrasonic or thermal sensing technology. Currently, capacitive sensing is most commonly used, in particular in applications where size and power consumption are important. Capacitive fingerprint sensors provide an indicative measure of the capacitance between (see FIG. 2) several sensing elements 202 and a finger 201 placed on the surface of the fingerprint sensor 102. Acquisition of a fingerprint image is typically performed using a fingerprint sensor 102 comprising a plurality of sensing elements 202 arranged in a two-dimensional manner.

In a general authorization process, the user places her finger 201 on the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 are in practice performed by the processing unit 103 embodied in the form of one or more microprocessors arranged to execute a computer program 107 downloaded to the storage medium 105 associated with the microprocessor, such as a Random Access Memory (RAM), a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

Figure 4:
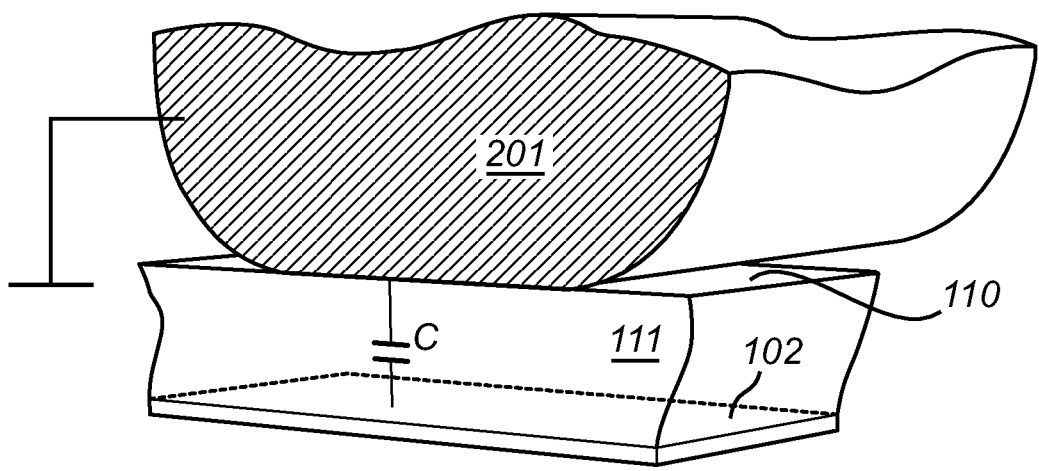
FIG. 4 illustrates the principle for capacitive fingerprint sensing.

FIG. 4 illustrates the principle for capacitive fingerprint sensing, as previously has been discussed. Upon a user contacting a surface 110 of a fingerprint sensing area (typically by touching the home button) of the smart phone with her finger 201, a capacitor C is formed between the surface 110 of the fingerprint sensing area and the fingerprint sensor 102 arranged inside the smart phone. The material 111 between the surface 110 and the fingerprint sensor 102 may be composed of e.g. glass or ceramic.

By measuring the capacitance between the surface 110 touched by the user and the sensor 102, the fingerprint of the user may be derived from an image captured by the fingerprint sensor 102 of the user's finger 201.

Due to various impairments, such as variations in the stack-up height of the material 111 between the surface 110 of the fingerprint sensing area and the fingerprint sensor 102, a damaged surface 110, sensor warpage, general imperfections in the properties of the material 111 quasi-stationary noise will be present in the images captured by the fingerprint sensor 102 which renders the deriving of a fingerprint from the captured images more difficult. Similar noise is also present in case of using optical or ultrasonic fingerprint sensing technologies.

It is desirable to take into account such noise—or impairment data—when extracting fingerprint feature data from captured images. The extracted fingerprint feature data is subsequently used for performing authentication, for instance for unlocking a smart phone 100 in which the fingerprint sensing system 100 is arranged, given that the captured fingerprint matches a pre-stored and authenticated fingerprint template.

With reference again to FIG. 4, during manufacturing and testing of the fingerprint sensor 102, a test device may be applied to the surface 110 of the fingerprint sensing area of the smart phone instead of a real finger. The test device may be embodied by an object commonly referred to as a (flat) rubber stamp. This rubber stamp typically entirely covers the area 110, and correspondingly all pixels of the fingerprint sensor 102. Such a rubber stamp is typically electrically conductive and connected to ground, in order to present an appropriately high capacitance to the sensor 102. Preferably the total capacitance generated by the rubber stamp should be the same as for a typical human finger. The rubber stamp is commonly used for testing fingerprint sensors.

Figure 5:
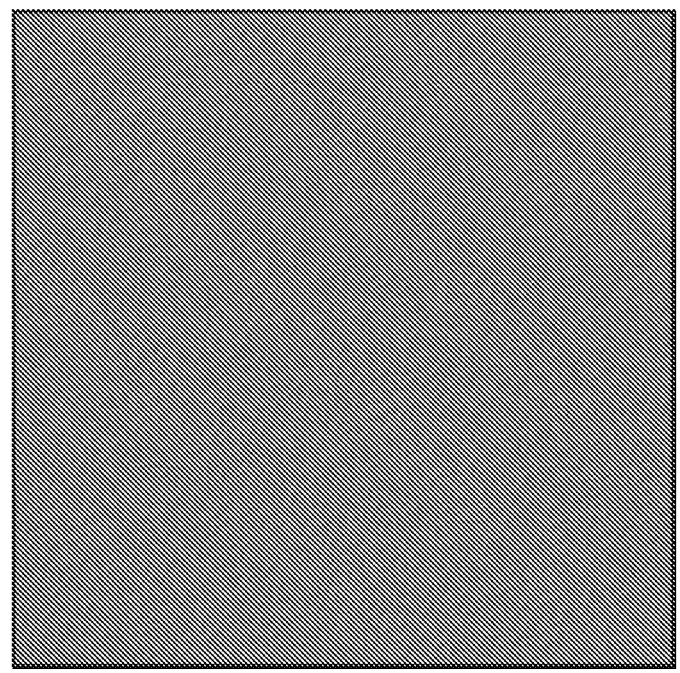
FIG. 5 illustrates an image captured by a fingerprint sensor where the object contacting the sensor is a rubber stamp.

With reference to FIG. 5, for a "perfect" sensor 102, surface 110 and material 111, an image captured by the sensor 102 of such a rubber stamp would be a uniformly black/grey, without any impairment data in the form of artefacts or noise present in the image, whereas in practice where the sensor 102, surface 110 and material 111 are subjected to impairments, impairment data forming some type of pattern is oftentimes present in the captured image.

Figures 6A, 6B, 6C:
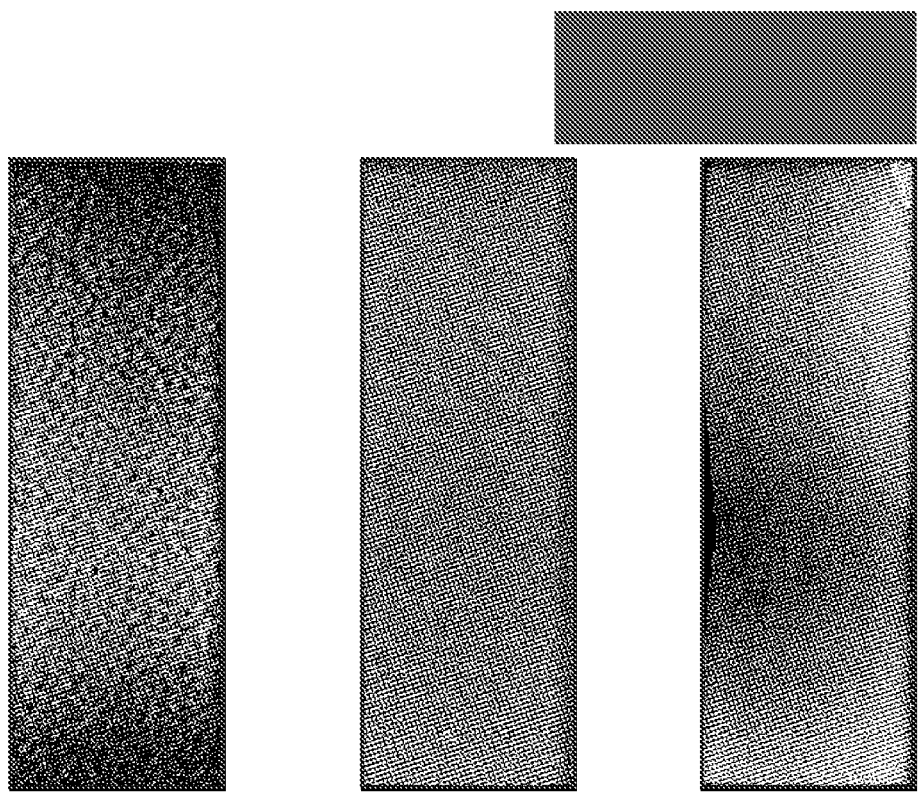
FIGS. 6A-C illustrate images captured by different individuals of fingerprint sensors being subjected to different impairments.

However, in practice, with reference to FIGS. 6A-C, different individuals of fingerprint sensors are subjected to different impairments, which as a result will give different appearances of the captured rubber stamp image.

Figure 7:
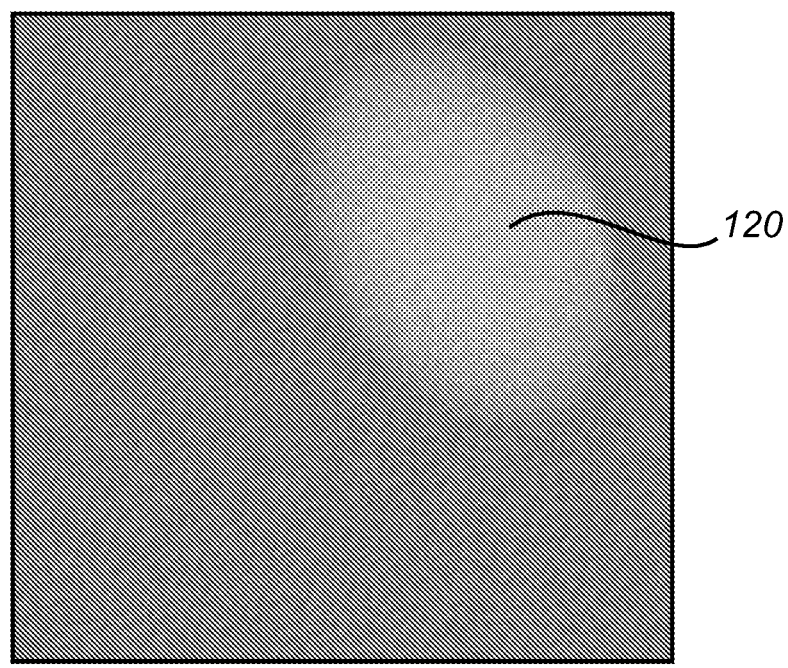
FIG. 7 illustrates the captured image of FIG. 5, but where the image further comprises impairment data.

FIG. 7 illustrates a further example of impairment data 120 present in the captured image in the form of more evident impairment data arranged in a circular or elliptic pattern. This is a pattern which may be the result of an air pocket created in the glass/ceramic material 111 between the surface 110 of the fingerprint sensing area and the fingerprint sensor 102, or by impurities in the glue between the sensor and the cover glass.

No matter the exact appearance of the impairment data present in a captured image, any impairment data will render the extraction of a fingerprint from a captured image more difficult, since the impairment data will obscure the fingerprint feature data present in a captured image.

Figure 8:
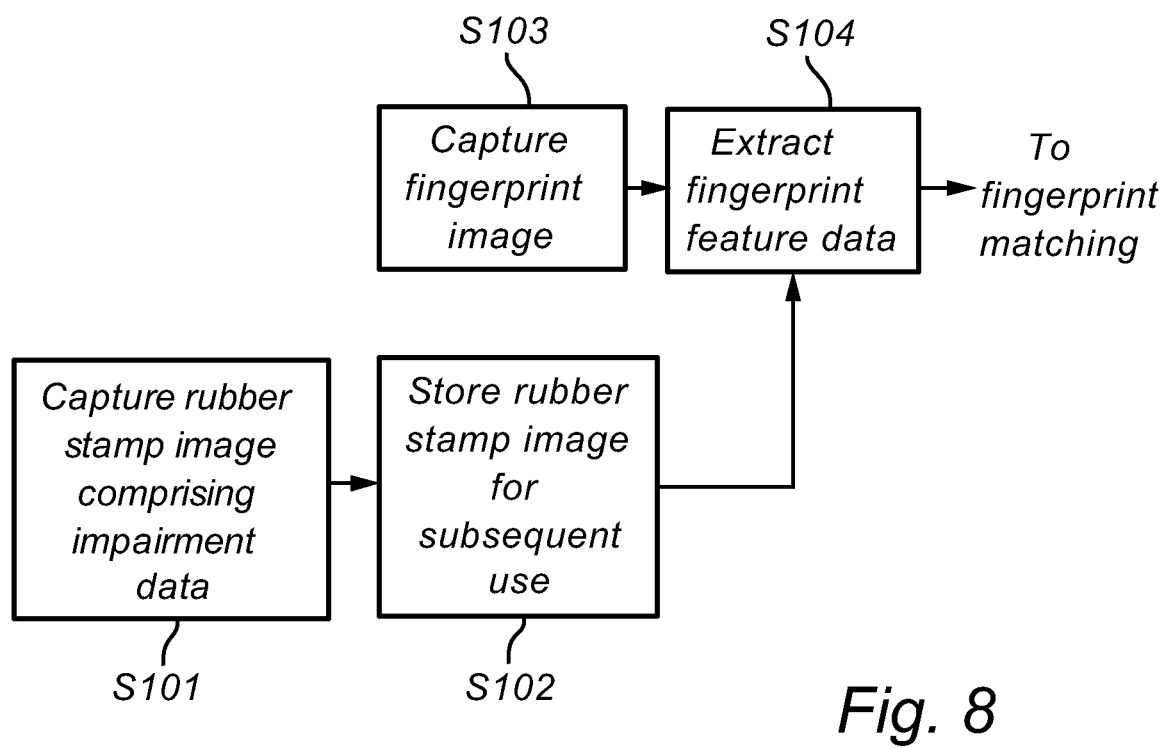
FIG. 8 illustrates a flowchart of the method of extracting fingerprint feature data from a captured image according to an embodiment of the present invention.

FIG. 8 illustrates a flowchart of a method according to an embodiment of the present invention which solves this problem by taking into account any impairment data present in a captured image when extracting fingerprint feature data from the image. Reference is further made to the fingerprint sensing system 101 of FIG. 3.

In a first step S101, the fingerprint sensor 102 captures an image of an object contacting the sensor 102. The object will be exemplified in the form of a rubber stamp, a "perfect" image of which was illustrated in FIG. 5. It is noted that several images may be captured, and that these images are combined to produce a single image representing the rubber stamp (or the combined result of repeated finger touches, as also will be discussed). This image may be captured during a manufacturing test of the fingerprint system 101 mounted in an intended electronic device 100, such as a smart phone.

Figure 9:
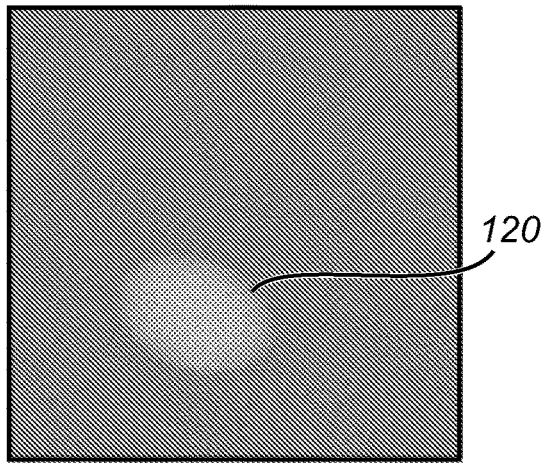
FIG. 9 illustrates the captured image of FIG. 5 comprising elliptically shaped impairment data.

In this exemplifying embodiment, the captured rubber stamp image is assumed to have the appearance shown in FIG. 9, i.e. comprising elliptically-shaped impairment data 120 (it should be noted that this is an illustrative example only; the impairment data can take on many forms and patterns).

Thereafter, in step S102, the captured rubber stamp image(s) comprising the impairment data is stored in the fingerprint system 101, for example in the OTP memory 108 embedded in the sensor die, or in a host memory of the electronic device 100. It is envisaged that the captured image(s) are downsampled or compressed before being stored.

Subsequently, when user of the electronic device 100 in which the fingerprint system 101 is arranged wishes to perform an authentication process with the electronic device being e.g. a smart phone, for instance by pressing her thumb against a home button of the smart phone under which the fingerprint sensor 102 is arranged for unlocking the smart phone 100, the fingerprint sensor 102 captures an image of the fingerprint of the user in step S103.

The previously stored image comprising the impairment data is thus fetched from the memory 108 by the processing unit 103.

Further, in step S104, the processing unit 103 extracts fingerprint feature data from the captured image of the fingerprint, i.e. data in the image representing fingerprint ridges and valleys.

Now, when performing the feature data extraction in step S104, the processing unit 103 fetches the previously stored rubber stamp image comprising impairment data and takes the rubber stamp image into account in the feature data extraction process of step S104.

Figure 10A:
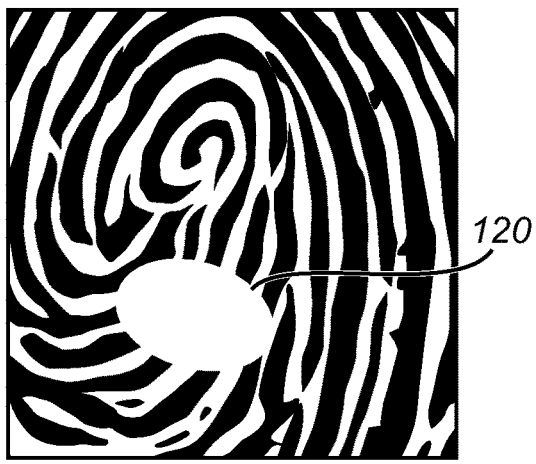
FIG. 10A-D illustrate four captured fingerprint images comprising impairment data.
Figure 10B:
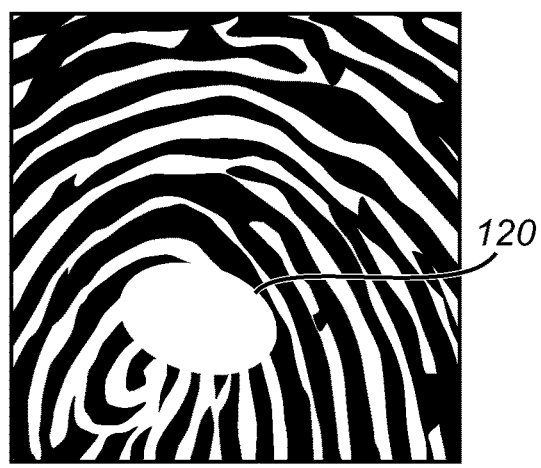
Figure 10C:
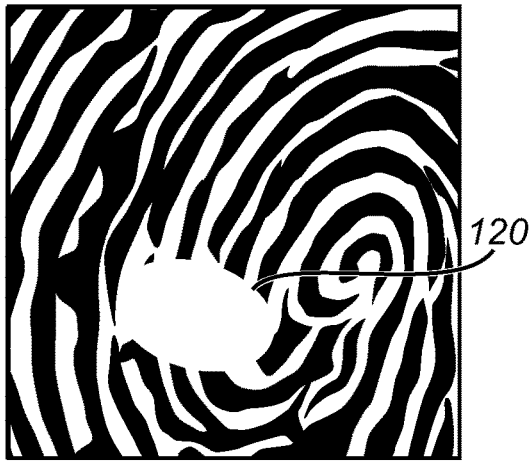
Figure 10D:
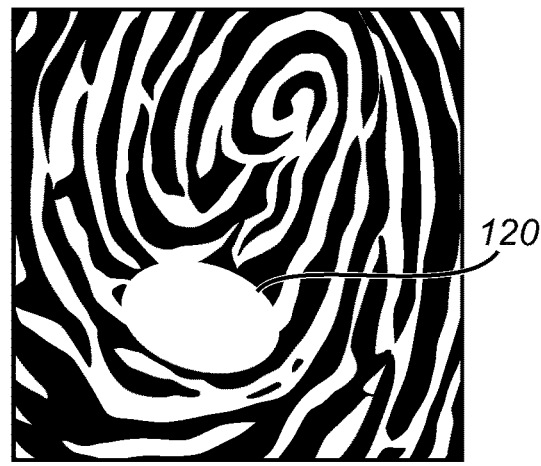

Further, reference is made to FIG. 10A illustrating a captured image of a fingerprint comprising the impairment data 120.

Thus, the stored rubber stamp image is taken into account in the feature data extraction step of S104 in that all or some of the fingerprint feature data located in the areas of the captured image where the impairment data 120 is present is lesser relied upon when extracting the fingerprint feature data than the feature data in sections of the image which are not indicated to comprise impairment data.

In an embodiment, it is envisaged that some or all of the feature data in sections of the image which are indicated in the stored rubber stamp image to comprise impairment data is excluded upon extracting the fingerprint feature data from the captured image.

Advantageously, this reduces the risk of so called false positives caused by fingerprint feature data being incorrectly extracted from impairment data in a captured image. Ultimately, this reduces the risk of falsely authenticating a user from feature data which is obscured by impairment data, potentially resulting in erroneously extracted fingerprint feature data.

FIG. 11 illustrates a flowchart of the method of extracting fingerprint feature data from a captured image according to another embodiment.

In this embodiment, a confidence metric is computed in step 101a for the impairment data present in the rubber stamp image captured in step S101.

Hence, if the presence of the impairment data 120 in the captured image is not considered reliable enough, it is given a low confidence metric value, while if the presence of the impairment data 120 in the captured image indeed is considered reliable, it is given a high confidence metric value.

As an example, a value of the confidence metric may be determined by comparing several images. If there is an area where the different images differ substantially, the confidence in that area would be considered low. On the other hand; if the impairment data appear identical in all images, a higher confidence value would be assigned to that area. For instance, the confidence metric could be assigned a range of 0 to 1, where a value close to 1 indicates high confidence while a value close to 0 indicates low confidence.

The confidence metric may be computed on a pixel-by-pixel-level or for a cluster of pixels in the rubber stamp image. It can also be envisaged that an overall confidence metric is computed for the complete stored image. Hence, one subset of the impairment data may be given by a first confidence metric value while another subset of the impairment data is given by a second confidence metric value, or a single confidence metric value is computed for the complete set of impairment data.

The computed impairment data confidence metric values(s) are then stored with the rubber stamp image in step S102.

Now, after the fingerprint sensor 102 has captured an image of the user's finger in step S103, the processing unit 103 extracts feature data from the captured image in step S104 by taking into account the stored rubber stamp image, and the associated reliability metric value(s) stored in step S103.

Again with reference to FIG. 10 illustrating a captured image of a fingerprint comprising the impairment data 120; the confidence metric value(s) associated with the rubber stamp image may be taken into account by giving the sections of the captured image indicated to comprise the impairment data 120 a lesser weight as compared to the sections of the image which are not indicated to comprise impairment data when extracting the fingerprint feature data in step 104.

Hence, as was previously discussed, it may be envisaged that sections being assigned a high impairment data confidence metric value is more or less excluded when extracting features since the presence of corresponding impairment data in case of a high confidence metric value is considered confirmed, while sections having a low impairment data confidence metric value at least to some degree is used when performing feature extraction since a low confidence metric value indicates that there is an uncertainty whether the corresponding impairment data in fact constitutes impairment data or not; it is desirable that actual fingerprint feature data is not erroneously confused with impairment data.

Advantageously, a higher impairment data confidence metric value confirms the presence of impairment data in the stored rubber stamp image; which in its turn may suggest that any fingerprint feature data in that section of the stored rubber stamp image is excluded when extracting fingerprint feature data from a captured image.

Figure 12A:
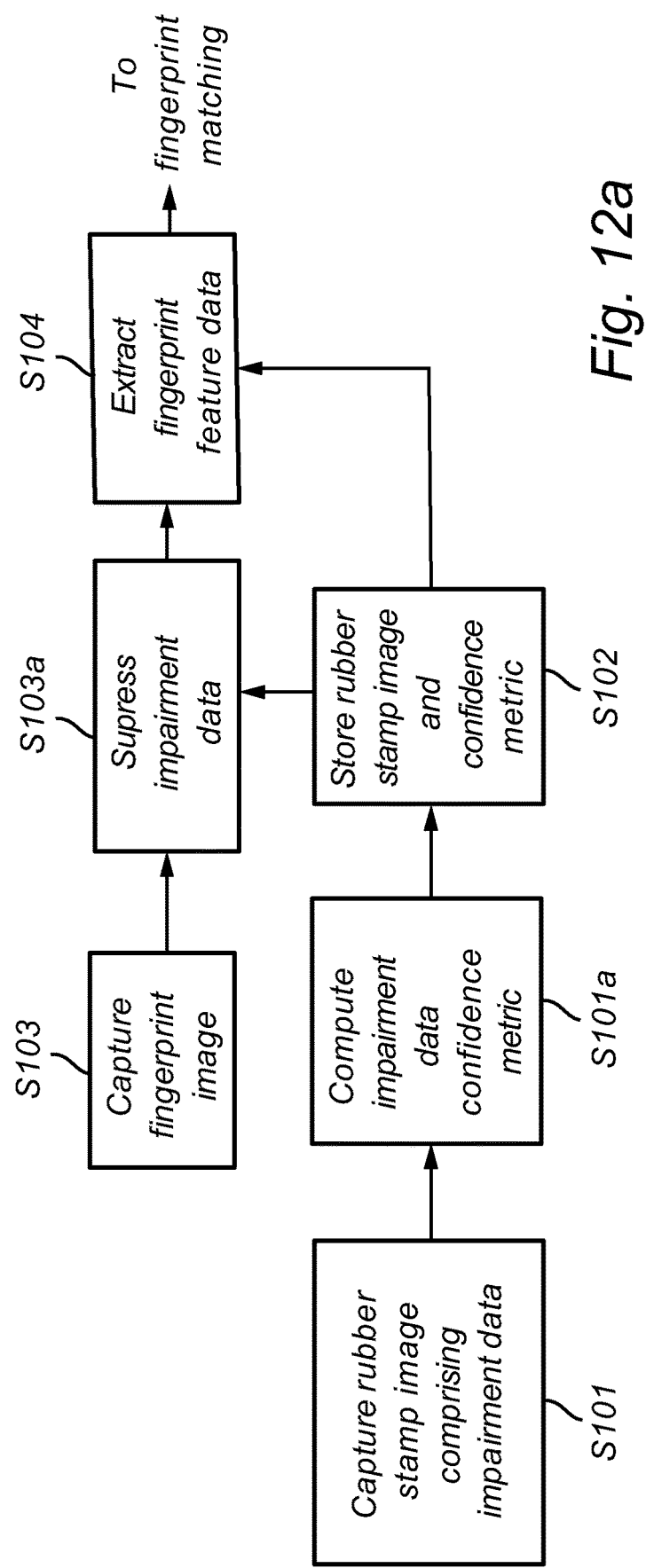
FIG. 12a illustrates a flowchart of the method of extracting fingerprint feature data from a captured image according to another embodiment of the present invention.

FIG. 12a illustrates a flowchart of the method of extracting fingerprint feature data from a captured image according to yet another embodiment.

In this embodiment, prior to performing feature extraction in step S104, the rubber stamp image stored in step S102 is used to at least partly suppress some or all of the impairment data present in the image captured in step S103. Optionally, as has been discussed with reference to the flowchart of FIG. 11, a confidence metric may be computed as shown in step S101a for the impairment data present in the rubber stamp image captured in step S101.

Hence, in step S103a, the processing unit 103 processes the captured fingerprint image using the stored captured image comprising the impairment data 120, wherein the impairment data 120 of the previously stored rubber stamp image suppresses, or even cancels out, the corresponding impairment data which is present in the captured fingerprint image, while the part of the image pertaining to the actual stamp leaves the fingerprint unaffected.

Figure 13:
FIG. 13 illustrates the captured fingerprint of FIG. 10A, but where the impairment data has been cancelled out.

As a result, an enhanced image as shown in FIG. 13 is advantageously obtained, where all the impairment data 120 present in the captured image of FIG. 10A optimally is completely cancelled out.

However, in practice, that may not always be the case, whereupon the stored rubber stamp image is used by the processor unit 103 in step S104 when extracting fingerprint feature data from the captured image that was enhanced in step S103a for subsequent authentication.

Thus, the stored rubber stamp image is taken into account in the feature data extraction step of S104 in that all or some of the fingerprint feature data located in the areas of the enhanced captured image where impairment data is present is lesser relied upon when extracting the fingerprint feature data than the feature data in sections of the enhanced image which are not indicated to comprise impairment data.

The processing can be performed in many ways; for instance, (a) the stored captured image comprising the impairment data 120 is subtracted from the captured fingerprint image, (b) a linear (or non-linear) combination of the captured fingerprint image and the stored image comprising the impairment data is performed, (c) linear (or non-linear) data fitting of the fingerprint data based on the impairment data, or (d) data modelling of the fingerprint based on the captured image and the stored image comprising the impairment data.

Hence, this embodiment advantageously cancels out the impairment data present in the captured image, which greatly helps improve subsequent fingerprint feature extraction from the captured image for subsequently matching the captured fingerprint to a pre-stored fingerprint template.

Figure 12B:
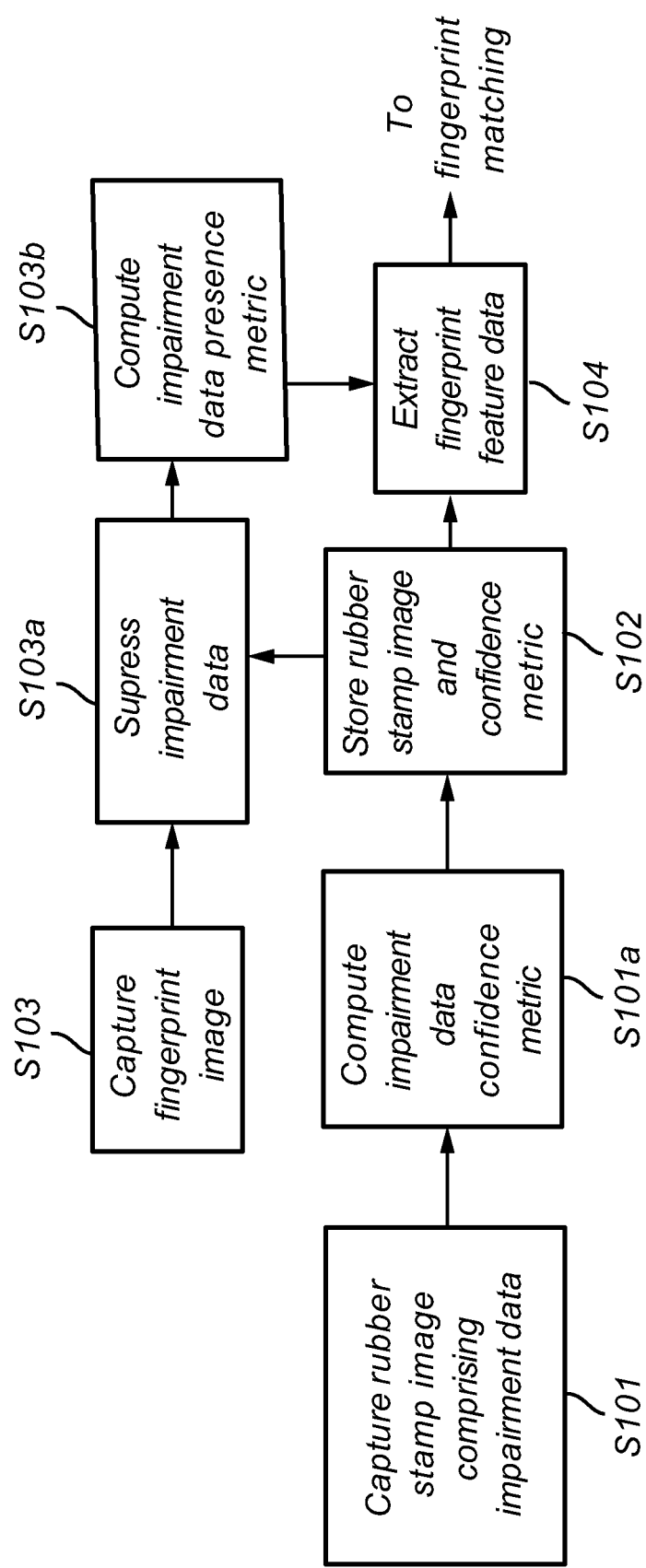
FIG. 12b illustrates a flowchart of the method of extracting fingerprint feature data from a captured image according to yet another embodiment of the present invention.

FIG. 12b illustrates a flowchart of the method of extracting fingerprint feature data from a captured image according to still another embodiment.

In this embodiment, prior to performing feature extraction in step S104, a presence metric is computed for the impairment data comprised in the enhanced captured image after the suppression step S103a. It is noted that a presence metric may be computed also in the case where no suppression of impairment data is performed. If so, the impairment data presence metric would be computed based on the "non-enhanced" image captured in step S103.

Now, in this particular exemplifying embodiment, after the impairment data has been suppressed in step S103a from the image captured in step S103, the processing unit 103 determines in step S103b to which degree the impairment data is still present in the captured image. That is, a presence metric is computed reflecting this degree.

If the suppression of impairment data in step S103a is successful, the presence metric is likely given a low value, indicating that the presence of impairment data is weak in the enhanced captured image. To the contrary, if the suppression of impairment data is weak, the presence metric is likely given a high value, indicating that the presence of impairment data is strong in the enhanced captured image.

Advantageously, by computing the presence metric in step S103b and subsequently taking the presence metric into account upon extracting fingerprint feature data in step S104, the feature extraction will depend on whether the impairment data is "strong" or "weak" in the enhanced captured image.

Hence, a low-value presence metric indicates that the (remaining) impairment data in the image is weak, wherein when extracting the fingerprint feature data from the captured image in step S104, the feature data in sections of the image which are indicated by the presence metric to comprise weak impairment data is more relied upon.

In contrast, a high-value presence metric indicates that the (remaining) impairment data in the image is strong, wherein when extracting the fingerprint feature data from the captured image in step S104, the feature data in sections of the image which are indicated by the presence metric to comprise strong impairment data is less relied upon.

It should be understood that the presence metric may be combined with—and balanced against—the confidence metric. It may for instance be envisaged that the confidence metric is high, indicating that the corresponding sections of the image should be less relied upon when extracting features as previously discussed. However, if the presence metric indicates weak impairment data, the corresponding sections of the image may still be relied upon to a certain degree.

Conversely, a scenario may arise where the confidence metric is low, indicating that the corresponding sections should be more relied upon as previously discussed. However, if the presence metric indicates strong impairment data, the corresponding sections of the image may be less relied upon as compared to an embodiment where only the confidence metric is considered.

Figure 14:
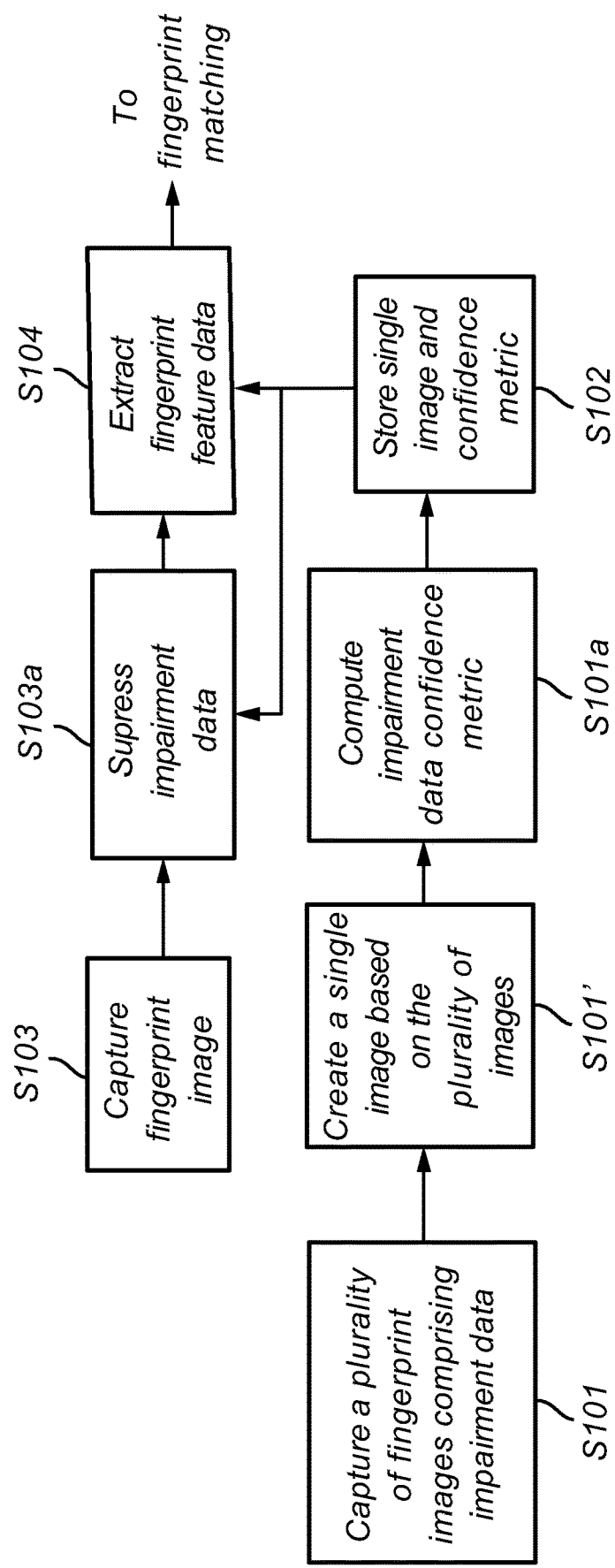
FIG. 14 illustrates a flowchart of the method of extracting fingerprint feature data from a captured image according to yet another embodiment of the present invention.

FIG. 14 illustrates a flowchart of the method of extracting fingerprint feature data from a captured image according to another embodiment.

In this particular embodiment, the object used is not a rubber stamp, but an actual finger of the user of the electronic device 100, being e.g. a smart phone.

In a first step S101, the fingerprint sensor 102 captures a plurality of images of the user's finger contacting the sensor 102, four of which are illustrated in FIGS. 10A-D.

As can be seen in FIGS. 10A-D, with respect to the actual fingerprint of the user, no image is likely to be identical to the other, as the user does not press her finger against the surface of the sensing area in the same manner for every captured image. Thus, in the four images illustrated in FIGS. 10A-D, the user's fingerprint is differently positioned, while the impairment data 120 which is caused by the electronic device 100, or the sensor 102 itself, remains constantly positioned in the captured images.

Again with reference to FIG. 14, after the plurality of images of the user's fingerprint has been captured in step S101, a single image is created in step S101' from the plurality of images. In practice, tens or even hundreds of images may be captured.

In an embodiment, the single image is created in step S101' by combining the plurality of images. For instance, the single image may be created by averaging the plurality of captured fingerprint images.

Reference is again made to the rubber-stamp image of FIG. 9, which is very similar to how the single image would look like when the plurality of captured fingerprint images are averaged to create the single image of step S101'. As was discussed hereinabove—for the plurality of captured images—the part of each captured image representing the fingerprint will differ from one image to another.

The averaging process would thus have a filtering effect on the plurality of images and create an image similar to the rubber stamp image, i.e. an image which is uniformly grey, with the exception of the impairment data 120 which remains constantly positioned throughout the plurality of images. This is important; if the part of the images pertaining to the actual fingerprint of the user is not "blurred out" when creating the single image, there is a risk that impairment data will not be suppressed correctly in case noise suppression is to be undertaken as discussed with reference to step S103a of FIG. 12a, and that there could even be further impairment data introduced in a subsequently captured fingerprint image. Further, it is important since any fingerprint feature data of the single image created in step S101' not being filtered out could potentially be interpreted by the processing unit 103 as impairment data, which would be taken into account subsequently when extracting fingerprint feature data from a captured image.

Optionally, a confidence metric is computed for the impairment data 120 of the single image in step S101a, as previously has been described.

The created image and any optionally computed impairment data confidence metric is then stored in step S102.

Now, as previously has been discussed, when user of the electronic device 100 in which the fingerprint system 101 is arranged wishes to perform an authentication process with the electronic device 100, the fingerprint sensor 102 captures a further image of the fingerprint of the user in step S103.

The previously stored image comprising the impairment data, which was created in step S101' from the plurality of captured fingerprint images being combined, is fetched from the memory 108 or from the host memory by the processing unit 103.

Then, in step S103a, the processing unit 103 optionally processes the further captured image of the fingerprint with the stored created image comprising the impairment data 120 that will be present in all captured images using this particular electronic device 100, in order to suppress the impairment data in said further captured image.

In this exemplifying embodiment, the processing by the processing unit 103 in step S104 comprises subtracting the captured image comprising the impairment data 120 from the further captured fingerprint image.

Again, the impairment data 120 of the previously created and stored fingerprint image cancels out the corresponding impairment data which is present in the captured fingerprint image, while the actual fingerprint in the captured image remains unaffected.

After the stored image of FIG. 9 comprising the impairment data 120 has been subtracted from the captured image for instance having the appearance illustrated in FIG. 10A, a clean fingerprint image is optimally obtained—as was illustrated in FIG. 13—where the impairment data 120 advantageously has been completely cancelled out.

However, in practice, there may still be impairment data present in the enhanced image obtained after the suppression performed in step S103a, whereupon the stored single image is used by the processor unit 103 in step S104 when extracting fingerprint feature data from the captured image that was enhanced in step S103a.

Thus, the stored image is taken into account in the feature data extraction step of S104 in that all or some of the fingerprint feature data located in the areas of the enhanced captured image where impairment data is present is lesser relied upon when extracting the fingerprint feature data than the feature data in sections of the enhanced image which are not indicated to comprise impairment data.

This embodiment of utilizing a user's finger for an "online" registration of images in which impairment data is present caused by impairments that the sensor 102 is subjected to has a number of advantages over the previously described "offline" approach using a rubber stamp (or any other test device having an appropriate test pattern being applied to the sensing area of the fingerprint sensor).

Firstly, by using the online finger registration process of FIG. 14, there is no need to perform the offline manufacturing test using the rubber stamp as described with reference to FIG. 8; the capturing of the images comprising the impairment data can be performed any time by the user, either upon configuration of the electronic device 100 in which the sensor 102 is arranged, or later.

For instance, it can be envisaged that one or a couple of images are captured each time the user touches the surface 100 of the sensing area of the sensor 102, for example when the user wishes to unlock the electronic device 100, being e.g. a smart phone, and when the processing unit 103 determines that a sufficient number of images have been captured, the single image is created and stored. Advantageously, the user will not have to engage in a tedious registration process for creating the image comprising the impairment data.

In this context, it may be envisaged that the electronic device 100 visually and/or audibly instructs the user how to press her finger against the surface 110 of the sensing area of the fingerprint sensor 102.

Secondly, the online finger registration process advantageously facilitates updating of the stored image. Since the electronic device is subjected to wear—for instance in the form of scratches and cracks in a cover glass covering the sensor 102—the impairments that the sensor 102 is subjected to changes over time.

This can be overcome by capturing a large set of new images for creating and storing the single image comprising the new impairment data. Alternatively, new images are repeatedly captured during normal user operation of the electronic device 100, which new images are combined with—e.g. averaged with—the stored single image, wherein the stored image changes over time to reflect changing impairments that the sensor is subjected to.

It is noted that, although not shown in FIG. 14, in accordance with FIG. 12b and the accompanying description, an impairment data presence metric may advantageously be computed and taken into account when extracting the fingerprint feature data in step S104 also in the case where the stored image is a fingerprint image and not a rubber stamp image.

Figure 15:
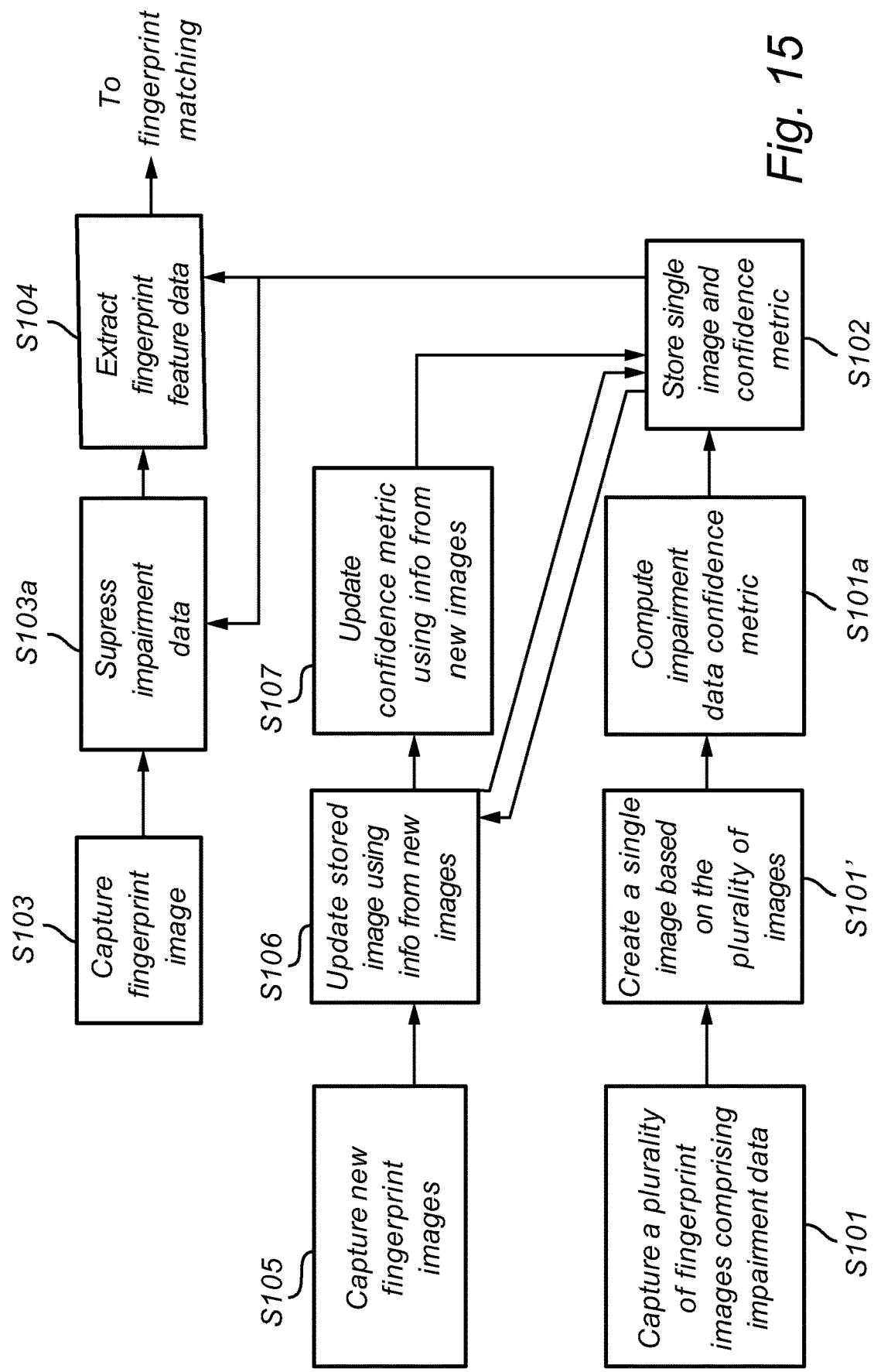
FIG. 15 illustrates a flowchart of the method of extracting fingerprint feature data from a captured image according to still another embodiment of the present invention.

FIG. 15 illustrates a flowchart of the method according to this embodiment. Hence, the process of FIG. 14 is initially performed, and fingerprint feature data is extracted in step S104.

Now, as the impairments that the fingerprint sensor 102 are subjected to changes over time, new images of the user's fingerprint are repeatedly captured in step S105, preferably during normal user operation of the electronic device 100.

These new images—or selected information from these images—are then, as indicated with step S106a combined with the stored single image, and the updated single image created by the combining is stored again in step S106b. Advantageously, the previously stored image would gradually change by being combined with information from new images. Alternatively, the previously stored image is replaced with a completely new image in step S106b, whereby step S106a is omitted.

As previously has been discussed, an impairment data confidence metric may further be computed for determining whether impairment data present in the captured images indeed constitute impairment data or not. A high confidence metric value would typically indicate that an assessment that impairment data is present in an image indeed is reliable. It may be envisaged that one or more predetermined threshold values are used for determining whether a metric value should be considered "high" or "low".

If such a metric is used, it is also computed in step S107 for the updated image and stored along with the updated image following step S106b.

Thereafter, the updated single image is optionally used in step S103a for suppressing impairment data in a captured image as previously has been described.

Since there still may be impairment data present in the enhanced image obtained after the suppression performed in step S103a, the stored single image is used by the processor unit 103 in step S104 when extracting fingerprint feature data from the captured image that was enhanced in step S103a.

Thus, the stored image is taken into account in the feature data extraction step of S104 in that all or some of the fingerprint feature data located in the areas of the enhanced captured image where impairment data is present is lesser relied upon when extracting the fingerprint feature data than the feature data in sections of the enhanced image which are not indicated to comprise impairment data.

A great advantage of capturing images of the user's finger during normal operation of the electronic device 100 implementing the fingerprint sensing system 101 is that estimation of the impairment data can be gradually improved over time (if any refinements are possible). Furthermore, an added benefit of such an approach is that impairments changing over time (i.e. that the user damages the glass covering the fingerprint sensor 102) can be compensated for.

Further, in an embodiment, it is envisaged that a small amount of fluid is applied onto the surface of the sensing area 110 of the sensor and/or to the user's finger before an image is captured, in order to further improve the stored image which is used for suppressing impairment data. With the fluid, distinctions between ridges and valleys of the fingerprint is blurred out, while the impairment data remains, which is an advantage for the image which is created and used to suppress impairment data present in a subsequently captured image.

Further, it is envisaged that a user performs a swipe and/or a rotational movement with her finger upon an image being captured; the moving part of the image may thus be identified as the finger while the stationary part of the image is identified as impairment data.

Figure 16:
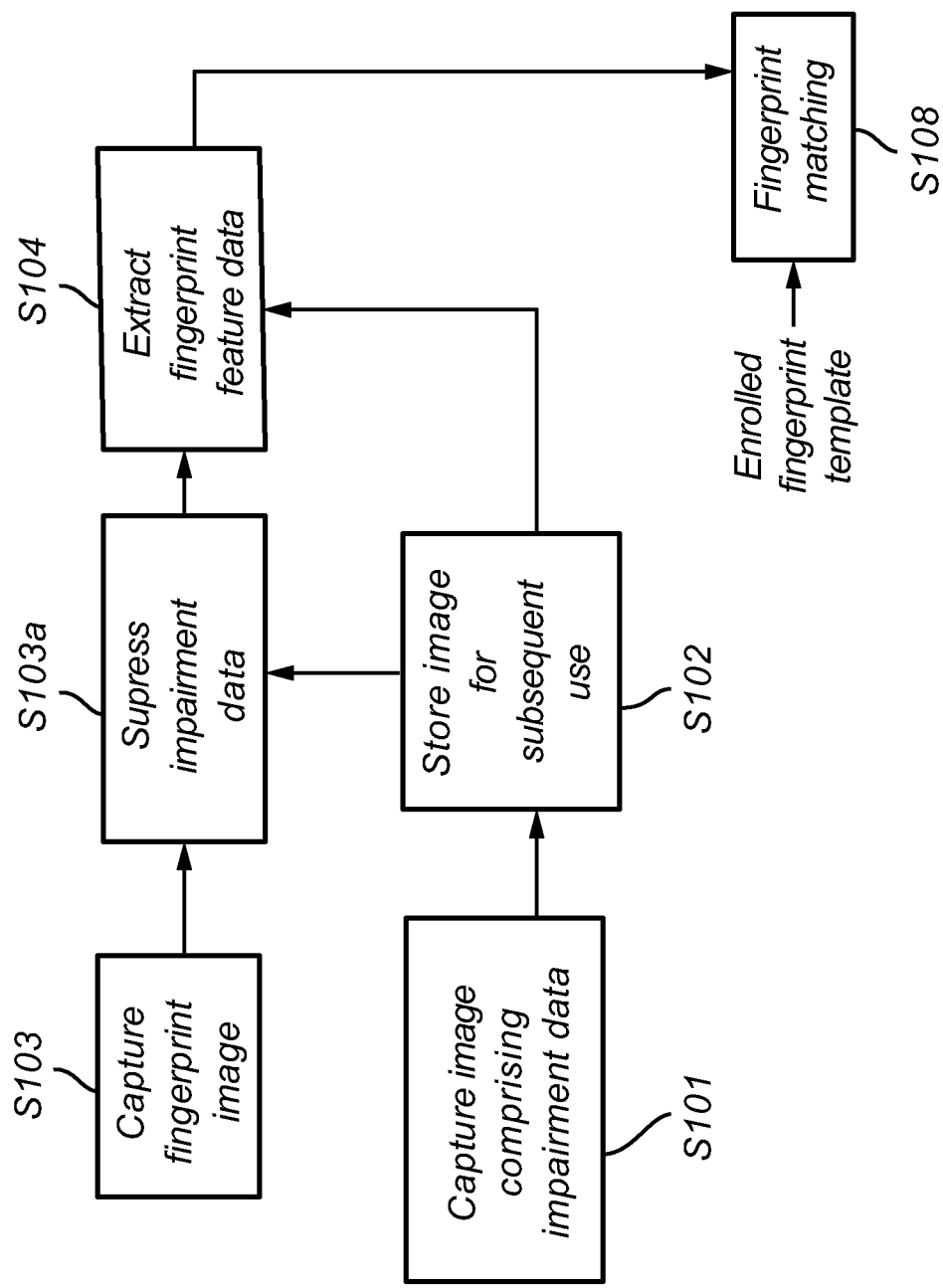
FIG. 16 illustrates a flowchart of the method of extracting fingerprint feature data from a captured image according to still a further embodiment of the present invention.

FIG. 16 illustrates a flowchart where a user is authenticated after the fingerprint feature data has been extracted in step S104 according to an embodiment of the invention.

Hence, in a first step S101, the fingerprint sensor 102 captures one or more images of an object contacting the sensor 102, such as a rubber stamp or a real finger.

Thereafter, in step S102, the captured image comprising the impairment data is stored in the fingerprint system 101, for example in the memory 108 embedded in the sensor die, or in a host memory of the electronic device 100.

Subsequently, when user of the electronic device 100 in which the fingerprint system 101 is arranged wishes to perform an authentication process with the electronic device being e.g. a smart phone, for instance by pressing her thumb against a home button of the smart phone under which the fingerprint sensor 102 is arranged for unlocking the smart phone 100, the fingerprint sensor 102 captures an image of the fingerprint of the user in step S103.

The previously stored image comprising the impairment data is thus fetched from the memory 108 by the processing unit 103.

As previously has been described, in step S103a, the processing unit 103 optionally processes the captured fingerprint image using the stored captured image comprising the impairment data 120, wherein the impairment data 120 of the previously stored rubber stamp image suppresses, or even cancels out, the corresponding impairment data which is present in the captured fingerprint image, while the part of the image pertaining to the actual stamp leaves the fingerprint unaffected.

Further, in step S104, the processing unit 103 extracts fingerprint feature data from the captured image of the fingerprint, i.e. data in the image representing fingerprint ridges and valleys in order to be able to authenticate the fingerprint of the user from the captured image.

Now, when performing the feature data extraction in step S104, the processing unit 103 fetches the previously stored image comprising impairment data and takes that image into account in the feature data extraction process of step S104.

Thus, the stored image is taken into account in the feature data extraction step of S104 in that all or some of the fingerprint feature data located in the areas of the captured image where the impairment data 120 is present is lesser relied upon when extracting the fingerprint feature data than the feature data in sections of the image which are not indicated to comprise impairment data.

Thus, after the fingerprint features have been extracted in step S104, the processing unit 103 compares it to one or more previously enrolled fingerprint templates stored in the memory 105. If the extracted fingerprint matches the pre-stored template in step S108, the user is authenticated and the processing unit 103 will typically instruct the electronic device 100, being e.g. a smart phone, to perform an appropriate action, such as transitioning from locked mode to unlocked mode, in which the user is allowed access to the smart phone 100.

In an embodiment, the image utilized to suppress impairment data is stored in step S102 in the memory 105 of the fingerprint sensing system 101, which memory is external from the actual sensor 102 (in contrast to the OTP 108 which is on-chip with the sensor 102). Advantageously, besides providing for a greater storage capacity, using the external memory 105 avoids storing the created image in the host device. Further advantageous is that in situations where there is a need to replace the fingerprint sensor 102 with a new sensor, the stored image comprising the impairment data need not be derived again by performing further tests, since the already created image can be acquired from the external memory upon connection of the new sensor to the memory. However, it is also possible that a new image must be captured and stored for the new sensor.

As has been discussed hereinabove, in case the impairment data is of an additive type, the processing unit 103 subtracts a scaled version of the stored image comprising the impairment data from the captured image, wherein the impairment data present in the captured image is suppressed or even cancelled out.

In another embodiment, in case the impairment data is of a multiplicative type, the processing unit 103 divides the impairment data present in the captured image with the impairment data of the single stored image, wherein the impairment data present in the captured image is suppressed or even cancelled out.

It can further be envisaged that the impairment data is both additive and multiplicative.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method of a fingerprint sensing system of extracting fingerprint feature data from an image captured by a fingerprint sensor of the fingerprint sensing system, comprising:

capturing at least one image of an object contacting the fingerprint sensor, the image comprising impairment data caused by impairments that the fingerprint sensor is subjected to;

storing the captured image comprising the impairment data;

capturing at least one further image of a fingerprint of a finger contacting the fingerprint sensor;

extracting fingerprint feature data from the captured at least one further image, wherein at least some of the feature data in sections of the image which are indicated in the stored image to comprise impairment data is lesser relied upon when extracting the fingerprint feature data than the feature data in sections of the image which are not indicated to comprise impairment data; and computing a confidence metric for the stored captured image comprising the impairment data, wherein when extracting the fingerprint feature data from the captured at least one further image, the feature data in sections of the image which are indicated in the stored image to comprise impairment data is more relied upon in case a value of the confidence metric indicates a low confidence for the impairment data, and less relied upon in case a value of the confidence metric indicates a high confidence for impairment data.

2. The method of claim 1, wherein in case the impairment data is similar over a plurality of captured images, the confidence metric is given a higher value.

3. The method of claim 1, wherein when extracting the fingerprint feature data from the captured at least one further image, at least some of the feature data in sections of the image which are indicated in the stored image to comprise impairment data is excluded when extracting the fingerprint feature data.

4. The method of claim 1, further comprising:
processing the further captured image of a fingerprint with the stored captured image comprising the impairment data in order to at least partly suppress the impairment data in said further captured image of a fingerprint.

5. The method of claim 1, further comprising:
computing a presence metric for the impairment data in the captured image;
wherein when extracting the fingerprint feature data from the captured at least one further image, the feature data in sections of the image which are indicated in the stored image to comprise impairment data is more relied upon in case a value of the presence metric indicates a low presence of the impairment data, and less relied upon in case a value of the presence metric indicates a high presence of the impairment data.

6. The method of claim 1, the object being a rubber stamp.

7. The method of claim 1, said object being a finger, wherein the capturing of at least one image of an object contacting the fingerprint sensor further comprises:
capturing a plurality of images of the fingerprint of the finger, the images comprising impairment data caused by impairments that the fingerprint sensor is subjected to;
creating, from the plurality of captured images of the fingerprint, an image comprising the impairment data, wherein the storing of the captured image comprises:
storing the created image comprising the impairment data.

8. The method of claim 7, wherein the plurality of images are captured during normal user operation of an electronic device in which the fingerprint sensing system is arranged.

9. The method of claim 8, wherein one or more images are repeatedly captured upon a user contacting the fingerprint sensor during normal user operation of the electronic device, wherein the image created from the plurality of captured images of the fingerprint is created and stored after a sufficient number of images of the fingerprint has been captured.

10. The method of claim 7, further comprising:
repeatedly capturing new images of the fingerprint, the images comprising impairment data;
creating, from the captured new images, an updated image comprising the impairment data;
storing the updated image comprising the impairment data, wherein the extracting of fingerprint feature data from the captured at least one further image is performed using the stored updated image.

11. The method of claim 10, wherein the processing of the further captured image of a fingerprint is performed using the stored updated image comprising the impairment data in order to at least partly suppress the impairment data present in said further captured image of a fingerprint.

12. The method of claim 10, further comprising:
computing an updated impairment data confidence metric based on the captured new images of the fingerprint and storing the updated confidence metric, wherein the stored updated confidence metric subsequently is taken into account when extracting the fingerprint feature data from the further captured image.

13. The method of claim 7, wherein the creation of the image comprising the impairment data from the plurality of captured images of the fingerprint comprises:
combining the plurality of captured images into a single image comprising the impairment data.

14. The method of claim 1, further comprising:
comparing the extracted fingerprint feature data of the captured image of the finger with one or more authorised pre-stored fingerprint templates; and
authenticating a user if the extracted fingerprint feature data of the captured image is considered to match one or more of the authorised pre-stored fingerprint templates.

15. A fingerprint sensing system comprising a processing unit configured to extract fingerprint feature data from an image captured by a fingerprint sensor of the fingerprint sensing system,
the fingerprint sensor being configured to:
capture at least one image of an object contacting the fingerprint sensor, the image comprising impairment data caused by impairments that the fingerprint sensor is subjected to; and
capture at least one further image of a fingerprint of a finger contacting the fingerprint sensor;
the processing unit being configured to:
store the captured image comprising the impairment data;
extract fingerprint feature data from the captured at least one further image, wherein at least some of the feature data in sections of the image which are indicated in the stored image to comprise impairment data is lesser relied upon when extracting the fingerprint feature data than the feature data in sections of the image which are not indicated to comprise impairment data; and
compute a confidence metric for the stored captured image comprising the impairment data,
wherein when extracting the fingerprint feature data from the captured at least one further image, the feature data in sections of the image which are indicated in the stored image to comprise impairment data is more relied upon in case a value of the confidence metric indicates a low confidence for the impairment data, and less relied upon in case a value of the confidence metric indicates a high confidence for impairment data.

16. The fingerprint sensing system of claim 15, the processing unit further being configured to:
assign a higher value to the confidence metric in case the impairment data is similar over a plurality of captured images.

17. An electronic device comprising the fingerprint sensing system of claim 15.

18. A computer program product comprising a non-transitory computer readable medium, the non-transitory computer readable medium having a computer program comprising computer-executable instructions embodied thereon for causing a fingerprint sensing system to perform the method of claim 1 when the computer-executable instructions are executed on a processing unit included in the fingerprint sensing system.

19. A method of a fingerprint sensing system of extracting fingerprint feature data from an image captured by a fingerprint sensor of the fingerprint sensing system, comprising:

capturing at least one image of an object contacting the fingerprint sensor, the image comprising impairment data caused by impairments that the fingerprint sensor is subjected to;

storing the captured image comprising the impairment data;

capturing at least one further image of a fingerprint of a finger contacting the fingerprint sensor;

extracting fingerprint feature data from the captured at least one further image, wherein at least some of the feature data in sections of the image which are indicated in the stored image to comprise impairment data is lesser relied upon when extracting the fingerprint feature data than the feature data in sections of the image which are not indicated to comprise impairment data; and computing a presence metric for the impairment data in the captured image, wherein when extracting the fingerprint feature data from the captured at least one further image, the feature data in sections of the image which are indicated in the stored image to comprise impairment data is more relied upon in case a value of the presence metric indicates a low presence of the impairment data, and less relied upon in case a value of the presence metric indicates a high presence of the impairment data.

20. The method of claim 19, wherein when extracting the fingerprint feature data from the captured at least one further image, at least some of the feature data in sections of the image which are indicated in the stored image to comprise impairment data is excluded when extracting the fingerprint feature data.

\* \* \* \* \*